E. Fales,
Stump Extractor.
No. 96,314. Patented Nov. 2. 1869.

Witnesses
F. A. Lehmann
C. L. Evert

Inventor
E. Fales
per Alexander & Mason

United States Patent Office.

EDWARD FALES, OF LANCASTER, MISSOURI.

Letters Patent No. 96,314, dated November 2, 1869.

IMPROVEMENT IN STUMP-EXTRACTORS.

The Schedule referred to in these Letters Patent and making part of the same.

*To all whom it may concern:*

Be it known that I, EDWARD FALES, of Lancaster, in the county of Schuyler, and in the State of Missouri, have invented new and useful Improvements in Machine for Pulling Grubs; and do hereby declare that the following is a full, clear, and exact description thereof, reference being had to the accompanying drawings, and to the letters of reference marked thereon.

The nature of my invention consists in the construction and general arrangement of a machine for pulling up stumps or grubs.

In order to enable others skilled in the art to which my invention appertains, to make and use the same, I will now proceed to describe its construction and operation, referring to the annexed drawings, which form a part of this specification, and in which—

Figure 1:
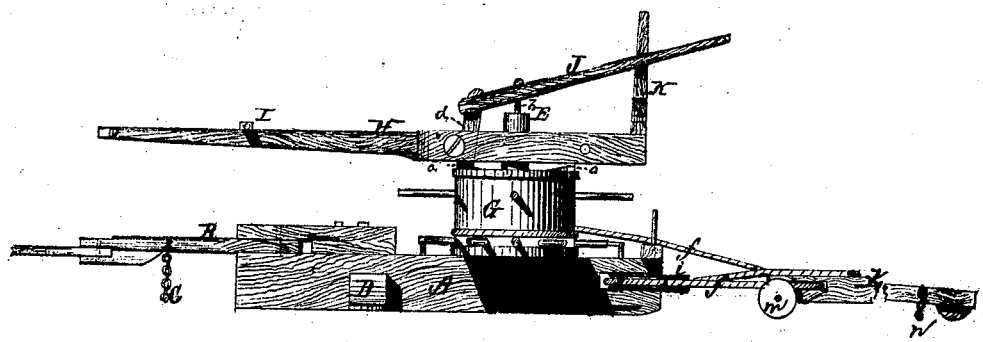

Figure 1 is a side view, and

Figure 2:
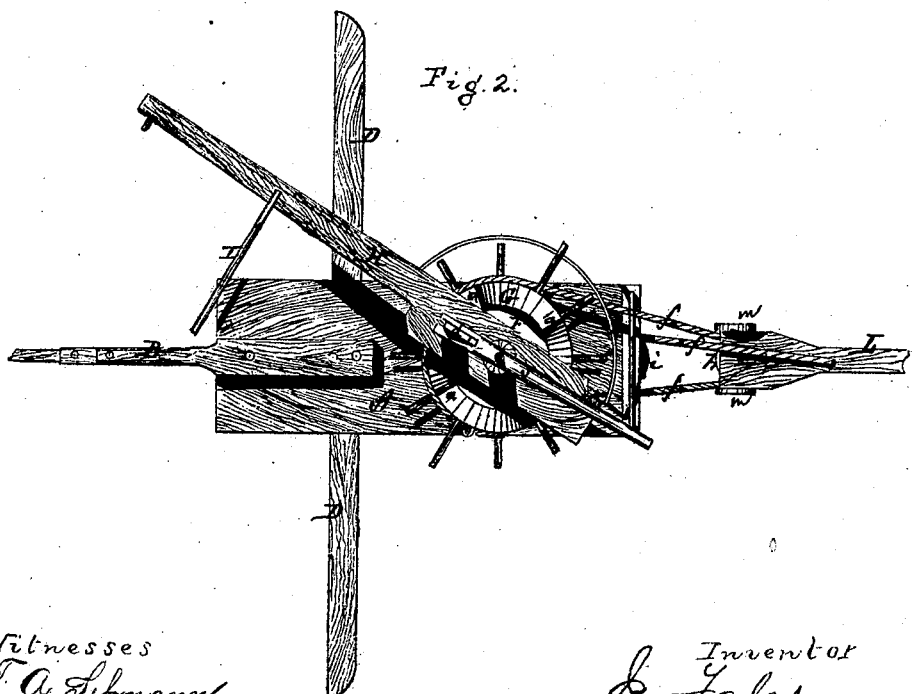

Figure 2, a plan view of the machine.

A represents the bed of the machine, which, at one end, is provided with a pivoted tail-piece, B, that is made fast to a tree by means of the chain C.

On each side of the bed A extends a beam, D, to stake the machine to the ground, if desired.

On the upper side of the bed A is an upright shaft, E, surrounded by a cylinder, F, suitably secured to the shaft, and also to the bed A.

Around this cylinder is placed the drum or reel G, which, on its upper edge, is provided with a series of teeth, *a a*, bevelled on one side, as seen in fig. 1.

Around the upper end of the shaft E, above the cylinder F and drum G, is placed the sweep H, to which the horse is hitched.

I is the usual hitch-pole, attached to the sweep H, for the purpose of hitching the horse.

At the upper end of the shaft E is a pin, *b*, that passes upward through a slot in the lever J, one end of which is pivoted to a small standard, *d*, on the sweep H, while the other end may be raised or lowered, and held in either position on a notched standard, K, at the inner end of the sweep.

It will readily be seen that by raising the lever J, the sweep is lowered, and *vice versa*.

On the under side of the sweep are two projections, *e e*, which, when the sweep is lowered, as above described, will catch on the teeth *a a* of the drum G, and consequently turn the same.

A rope or chain, *f*, is secured to the drum G, and passes around a pulley, *h*, in the rear end of the tackle-pole L, thence back to and around a pulley, *i*, in the end of the bed A, and then to the tackle-pole, where it is secured.

The rear end of the tackle-pole L is provided with two small wheels, *m m*, and the front end with a chain, *n*, which is made fast to the grub that is to be pulled.

Having thus fully described my invention,

What I claim as new, and desire to secure by Letters Patent, is—

1. The arrangement, upon the bed A, having side-beams, D D, of the pivoted tail-piece B, stationary shaft E, with cylinder F, and revolving drum G, provided with bevelled teeth *a a*, all substantially as shown and described.

2. The sweep H, around the shaft E, and having projections *e e* on its under side, in combination with the pin *b*, slotted lever J, and notched standard K, all substantially as and for the purposes herein set forth.

3. The tackle-pole L, provided with wheels *m m*, and pulley *h*, in combination with the rope or chain *f*, pulley *i*, and drum G, all substantially as and for the purposes herein set forth.

In testimony that I claim the foregoing, I have hereunto set my hand and seal, this 21st day of July, 1869.

EDWARD FALES. [L. S.]

Witnesses:
W. D. FRENCH,
M. M. FELTON.